(12) United States Patent
Ogawa et al.

(10) Patent No.: US 9,106,384 B2
(45) Date of Patent: Aug. 11, 2015

(54) RECEIVER APPARATUS, TRANSMITTER APPARATUS, SETTING METHOD, AND DETERMINING METHOD

(75) Inventors: Yoshihiko Ogawa, Kanagawa (JP); Daichi Imamura, Beijing (CN)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 64 days.

(21) Appl. No.: 14/126,503

(22) PCT Filed: Jun. 15, 2012

(86) PCT No.: PCT/JP2012/003925
§ 371 (c)(1),
(2), (4) Date: Dec. 16, 2013

(87) PCT Pub. No.: WO2013/005377
PCT Pub. Date: Jan. 10, 2013

(65) Prior Publication Data
US 2014/0126510 A1 May 8, 2014

(30) Foreign Application Priority Data
Jul. 1, 2011 (JP) .................................. 2011-147557

(51) Int. Cl.
*H04L 5/00* (2006.01)
(52) U.S. Cl.
CPC .................................... *H04L 5/0053* (2013.01)
(58) Field of Classification Search
CPC .................................................... H04L 5/0053
See application file for complete search history.

(56) References Cited

U.S. PATENT DOCUMENTS

| 2005/0220229 | A1* | 10/2005 | Goto .............................. 375/343 |
| 2008/0151813 | A1* | 6/2008 | Xing et al. ..................... 370/324 |
| 2008/0225960 | A1* | 9/2008 | Kotecha et al. ................ 375/259 |
| 2010/0177746 | A1* | 7/2010 | Gorokhov et al. ............. 370/336 |

(Continued)

FOREIGN PATENT DOCUMENTS

| EP | 2391168 A1 | 11/2011 |
| JP | 2010-171885 A | 8/2010 |
| WO | WO 02/23382 A1 * | 3/2002 .............. G06F 17/00 |

OTHER PUBLICATIONS

3GPP TS 36.211 V10.1.0, 3rd Generation Partnership Project; Technical Specification Group Radio Access Network; Evolved Universal Terrestrial Radio Access (E-UTRA); Physical Channels and Modulation (Release 10) Mar. 2011.

(Continued)

*Primary Examiner* — Jay P Patel
(74) *Attorney, Agent, or Firm* — Pearne & Gordon LLP

(57) ABSTRACT

Provided is a receiver apparatus that can improve the flexibility of setting resource candidates used for transmitting a reference signal. In this apparatus, a setting unit (101) sets a reference signal resource candidate group including a desirable SRS resource candidate group in a macro cell and also including a desirable SRS resource candidate group in a pico cell. The setting unit (101) further generates cancel information used for canceling, from the reference signal resource candidate group, an excessive resource that is included in the reference signal resource candidate group but not included in a first desirable resource candidate group. Then, ID information of a resource pattern, which determines the reference signal resource candidate group, and the cancel information are sent to a terminal (200).

18 Claims, 13 Drawing Sheets

(56) References Cited

U.S. PATENT DOCUMENTS

| | | | |
|---|---|---|---|
| 2010/0250244 A1* | 9/2010 | Zhong et al. | 704/203 |
| 2011/0305295 A1* | 12/2011 | Kim et al. | 375/295 |
| 2011/0306347 A1* | 12/2011 | Choi et al. | 455/438 |
| 2012/0069803 A1 | 3/2012 | Iwamura et al. | |
| 2012/0087299 A1* | 4/2012 | Bhattad et al. | 370/315 |
| 2012/0307808 A1* | 12/2012 | Song et al. | 370/336 |
| 2013/0039284 A1* | 2/2013 | Marinier et al. | 370/329 |

OTHER PUBLICATIONS

3GPP TS 36.331 V10.2.0, Scheduling Request Config Information Element, pp. 189-190, Jun. 2011.

3GPP TS 36.211 V10.2.0, Sounding Reference Signal Subframe Configuration, p. 39, Jun. 2011.

International Search Report for Application No. PCT/JP2012/003925 dated Aug. 7, 2012.

* cited by examiner

| srs-SubframeConfig | Binary | Configuration Period $T_{SFC}$ (subframes) | Transmission offset $\Delta_{SFC}$ (subframes) |
|---|---|---|---|
| 0 | 0000 | 1 | {0} |
| 1 | 0001 | 2 | {0} |
| 2 | 0010 | 2 | {1} |
| 3 | 0011 | 5 | {0} |
| 4 | 0100 | 5 | {1} |
| 5 | 0101 | 5 | {2} |
| 6 | 0110 | 5 | {3} |
| 7 | 0111 | 5 | {0,1} |
| 8 | 1000 | 5 | {2,3} |
| 9 | 1001 | 10 | {0} |
| 10 | 1010 | 10 | {1} |
| 11 | 1011 | 10 | {2} |
| 12 | 1100 | 10 | {3} |
| 13 | 1101 | 10 | {0,1,2,3,4,6,8} |
| 14 | 1110 | 10 | {0,1,2,3,4,5,6,8} |
| 15 | 1111 | reserved | reserved |

FIG. 1

| srs-SubframeConfig | Binary | Configuration Period $T_{SFC}$ (subframes) | Transmission offset $\Delta_{SFC}$ (subframes) |
|---|---|---|---|
| 0 | 0000 | 1 | {0} |
| 1 | 0001 | 2 | {0} |
| 2 | 0010 | 2 | {1} |
| 3 | 0011 | 5 | {0} |
| 4 | 0100 | 5 | {1} |
| 5 | 0101 | 5 | {2} |
| 6 | 0110 | 5 | {3} |
| 7 | 0111 | 5 | {0,1} |
| 8 | 1000 | 5 | {2,3} |
| 9 | 1001 | 10 | {0} |
| 10 | 1010 | 10 | {1} |
| 11 | 1011 | 10 | {2} |
| 12 | 1100 | 10 | {3} |
| 13 | 1101 | 10 | {0,1,2,3} |
| 14 | 1110 | 10 | {0,1,2,3,4,5,6} |
| 15 | 1111 | reserved | reserved |

PART NOT TO BE INCLUDED IN SECOND PER-CELL INDICATION (rows 13–15)

FIG. 13

RECEIVER APPARATUS, TRANSMITTER APPARATUS, SETTING METHOD, AND DETERMINING METHOD

TECHNICAL FIELD

The present invention relates to a receiving apparatus, a transmitting apparatus, a setting method and an identifying method.

BACKGROUND ART

In uplink of 3GPP LTE (3rd Generation Partnership Project Long-term Evolution, hereinafter, simply referred to as "LTE"), a P-SRS (Periodic Sounding Reference Signal) is used for measuring reception quality between a base station and terminals (see NPL 1, for example). The P-SRS is mapped to an SRS resource and transmitted from the terminals to the base station. At this time, first, a higher layer indication for each cell (hereinafter, referred to as a "first per-cell indication") is used to set an SRS resource candidate group (hereinafter, referred to as a "first SRS resource candidate group") common to all the terminals located in a target cell, that is, an "SRS resource pattern." Then, a higher layer indication for each terminal (hereinafter, referred to as a "per-terminal indication") is used to assign a plurality of SRS resource candidates constituting the first SRS resource candidate group to terminals to which SRS resources are to be assigned. The terminals map P-SRSs to the assigned SRS resources (hereinafter, referred to as "per-terminal SRS resources") to transmit to the base station. It should be noted that each SRS resource candidate is a last symbol in an "SRS transmission candidate subframe." Because none of the terminals in the cell in which the above-described "first SRS resource candidate group" is set transmits data using the SRS resource candidates, collision between an SRS and data signal is prevented.

In LTE, "srs-SubframeConfig" or the like is defined as the first per-cell indication. By means of the srs-SubframeConfig number shown in FIG. 1 transmitted from the base station to the terminals, the base station instructs the terminals on a transmission interval (TSFC) for transmitting P-SRSs, and an offset amount ($\Delta$SFC) for designating a subframe to be used for starting transmission of P-SRSs. For example, when the srs-subframeConfig number is 4, the SRS transmission candidate subframes are the second ($=1+\Delta$SFC), the seventh ($=1+\Delta$SFC+(TSFC*1)), . . . , and the (1+$\Delta$SFC+(TSFC*n))-th subframes (see FIG. 2).

Meanwhile, in LTE-Advanced (Rel.11), a heterogeneous cell configuration (HetNet: Heterogeneous Network) in which a pico cell is disposed in a macro cell has been proposed, and improvement of capacity in this heterogeneous cell configuration is being studied (see FIG. 3). In a heterogeneous cell, a signal transmitted from a terminal which belongs to the macro cell (hereinafter, referred to as a "macro cell terminal") to a base station providing the macro cell (hereinafter, referred to as a "macro cell base station") also arrives at a base station providing the pico cell (hereinafter, referred to as a "pico cell base station"). Therefore, interference between the macro cell and the pico cell in the pico cell (hereinafter, referred to as "pico cell interference") becomes large.

There are possible methods for reducing the pico cell interference as described below. First, interference between data signals (for example, between PDSCH (Physical Downlink Shared CHannel)) can be reduced by assigning different frequencies to the macro cell and the pico cell (i.e., frequency division) by PDCCH (Physical Downlink Control CHannel) signaling used in LTE. Further, interference between control signals (for example, between PUCCH (Physical Uplink Control CHannel)) can be reduced by assigning different frequencies to the macro cell and the pico cell (i.e., frequency division) by RRC signaling used in LTE. Still further, interference between SRSs can be avoided by assigning different time to the macro cell and the pico cell (i.e., time division) by the RRC signaling. While interference provided to the pico cell base station by a signal transmitted to the macro cell base station will be mainly described here, the same applies to interference provided to the macro cell base station by a signal transmitted to the pico cell base station.

Here, applying the above-described first per-cell indication makes it possible to reduce interference provided to an SRS transmitted to the pico cell base station by a data signal (or an SRS) transmitted to the macro cell base station.

Specifically, the srs-SubframeConfig number indicating the first SRS resource candidate group is indicated to the macro cell terminal by the first per-cell indication. The "first SRS resource candidate group" described here includes all the desired SRS resource candidates constituting a "desired SRS resource candidate group" in the macro cell and all the desired SRS resource candidates constituting a "desired SRS resource candidate group" in the pico cell. That is, the first SRS resource candidate group indicated to the macro cell terminal needs to include the "desired SRS resource candidate group" in the pico cell. The "desired SRS resource candidate group" described here refers to a subframe group necessary as SRS resource candidates in each of the macro cell and the pico cell.

For example, when SRSs are transmitted at an interval of 5 ms in both the macro cell and the pico cell, the srs-SubframeConfig number in the pico cell can be set to 4 (transmission interval TSFC=interval of 5 ms, offset amount $\Delta$SFC=1). At this time, the srs-SubframeConfig number in the macro cell can be set to 7 (transmission interval TSFC=interval of 5 ms, offset amount $\Delta$SFC=0 and 1) (see FIG. 4).

In this way, the SRS resource candidates in the pico cell also become the SRS resource candidates in the macro cell.

With the SRS resource candidate group in the macro cell and the SRS resource candidate group in the pico cell set in this way, the SRS resources for only pico cell or the SRS resources for only macro cell are set to each SRS resource candidate by the per-terminal indication. Accordingly, it is possible to prevent the SRS transmitted from the macro cell terminal from colliding with the signal transmitted from the pico cell terminal, so that it is possible to reduce pico cell interference.

CITATION LIST

Non-Patent Literature

NPL 1
TS36.211 v10.1.0 "3GPP TSG RAN; Evolved Universal Terrestrial Radio Access (E-UTRA); Physical Channels and Modulation"

SUMMARY OF INVENTION

Technical Problem

However, as described above, because the first SRS resource candidate group indicated to the macro cell terminal needs to include the "desired SRS resource candidate group" for the pico cell, selectable srs-SubframeConfig numbers are limited. Accordingly, there is a case where selecting the srs-SubframeConfig numbers including a subframe which corresponds to neither the "desired SRS resource candidate group" in the macro cell nor the "desired SRS resource candidate group" is unavoidable.

For example, when SRSs are transmitted at an interval of 10 ms in the macro cell and SRSs are transmitted at an interval of 2 ms in the pico cell, the srs-SubframeConfig number may be set to 2 (transmission interval TSFC=interval of 2 ms, offset amount ΔSFC=1) in the pico cell, while the srs-SubframeConfig number may be set to 0 (transmission interval TSFC=interval of 1 ms, offset amount ΔSFC=0) in the macro cell (see FIG. 5). At this time, subframes which are not used for SRS transmission in the macro cell (here, the third, fifth, seventh, ninth, . . . , subframes) are also set as the SRS resource candidates. As a result, a transmission resource region for a data signal (for example, PUSCH) is excessively reduced, which causes a problem of degrading throughput.

An object of the present invention is to provide a receiving apparatus, a transmitting apparatus, a setting method and an identifying method which can improve flexibility of setting of a resource candidate to be utilized for transmission of a reference signal.

Solution to Problem

A receiving apparatus according to an aspect of the present invention is an apparatus configured to receive a reference signal transmitted from a transmitting apparatus located in a first area, the reference signal being transmitted using a resource candidate belonging to a first desired resource candidate group, the receiving apparatus including: a setting section that sets a reference signal resource candidate group including the first desired resource candidate group and a second desired resource candidate group in a second area which is subjected to interference from the first area by the reference signal, that generates release information for releasing an excessive resource which is included in the reference signal resource candidate group but is not included in the first desired resource candidate group from the reference signal resource candidate group, and that outputs the generated release information and identification information of a resource pattern for identifying the reference signal resource candidate group; and a transmitting section that transmits the identification information of the resource pattern and the release information to the transmitting apparatus.

A transmitting apparatus according to an aspect of the present invention is an apparatus configured to transmit a reference signal to a receiving apparatus configured to provide a cell that covers a first area, using a resource candidate belonging to a first desired resource candidate group, the transmitting apparatus including: a reception processing section that extracts from a signal transmitted from the receiving apparatus, identification information of a resource pattern for identifying a reference signal resource candidate group including the first desired resource candidate group and a second desired resource candidate group in a second area which is subjected to interference from the first area by the reference signal, and release information for releasing an excessive resource which is included in the reference signal resource candidate group but is not included in the first desired resource candidate group from the reference signal resource candidate group; and a control section that identifies the first desired resource candidate group based on the identification information of the resource pattern and the release information.

A setting method according to an aspect of the present invention is a setting method for a resource candidate belonging to a first desired resource candidate group used for transmission of a reference signal by a transmitting apparatus located in a first area, the setting method including: setting a reference signal resource candidate group including the first desired resource candidate group and a second desired resource candidate group in a second area which is subjected to interference from the first area by the reference signal; generating release information for releasing an excessive resource which is included in the reference signal resource candidate group but is not included in the first desired resource candidate group from the reference signal resource candidate group; and transmitting identification information of a resource pattern and the release information to the transmitting apparatus.

An identifying method according to an aspect of the present invention is a method for identifying a resource candidate in a receiving apparatus in a first area for transmitting a reference signal using a resource candidate belonging to a first desired resource candidate group, the identifying method including: extracting from a signal transmitted from the receiving apparatus, identification information of a resource pattern for identifying a reference signal resource candidate group including the first desired resource candidate group and a second desired resource candidate group in a second area which is subjected to interference from the first area by the reference signal, and release information for releasing an excessive resource which is included in the reference signal resource candidate group but is not included in the first desired resource candidate group from the reference signal resource candidate group; and identifying the first desired resource candidate group based on the identification information of the resource pattern and the release information.

Advantageous Effects of Invention

According to the present invention, it is possible to provide a receiving apparatus, a transmitting apparatus, a setting method and an identifying method which can improve flexibility of setting of a resource candidate to be utilized for transmission of a reference signal.

BRIEF DESCRIPTION OF DRAWINGS

FIG. 1 illustrates an SRS resource pattern table.

FIG. 13 is an example of a partial table of an SRS resource pattern table according to Embodiment 3 of the present invention.

DESCRIPTION OF EMBODIMENTS

Figure 2:
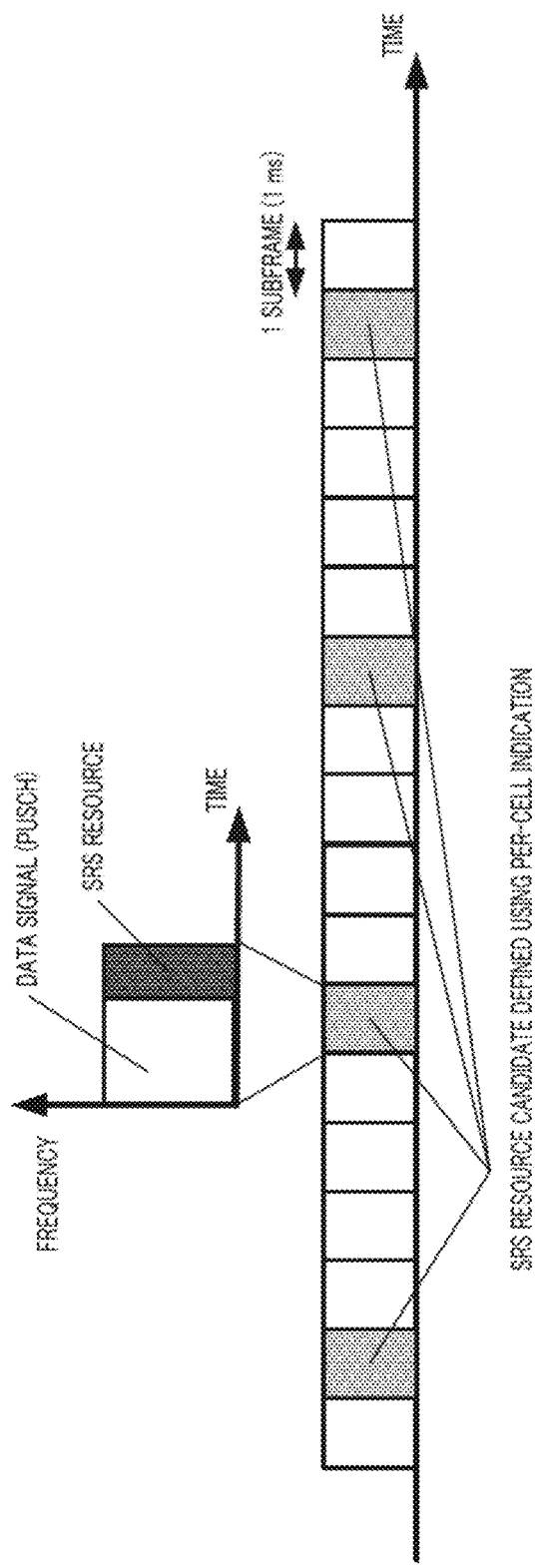
FIG. 2 illustrates SRS transmission candidate subframes.
Figure 3:
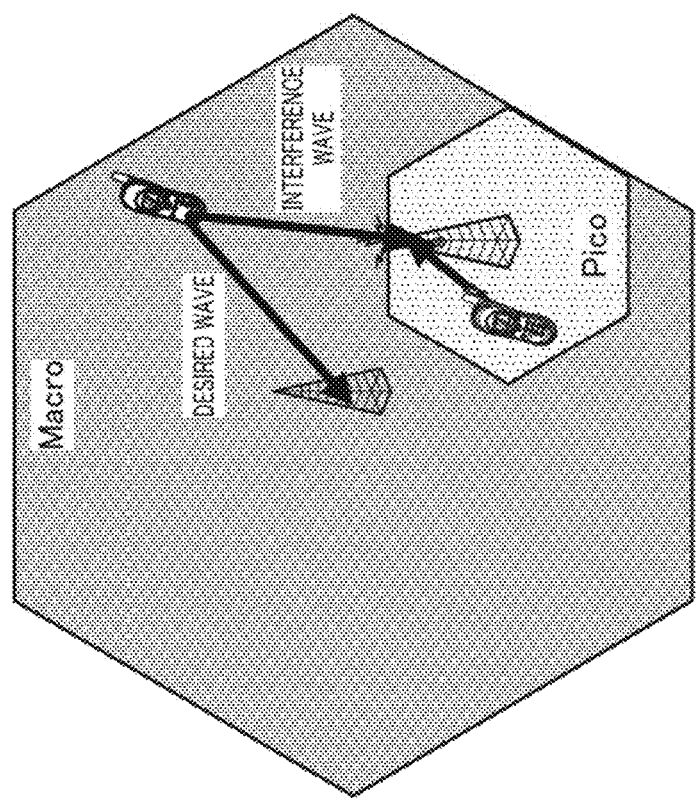
FIG. 3 illustrates a heterogeneous cell.
Figure 4:
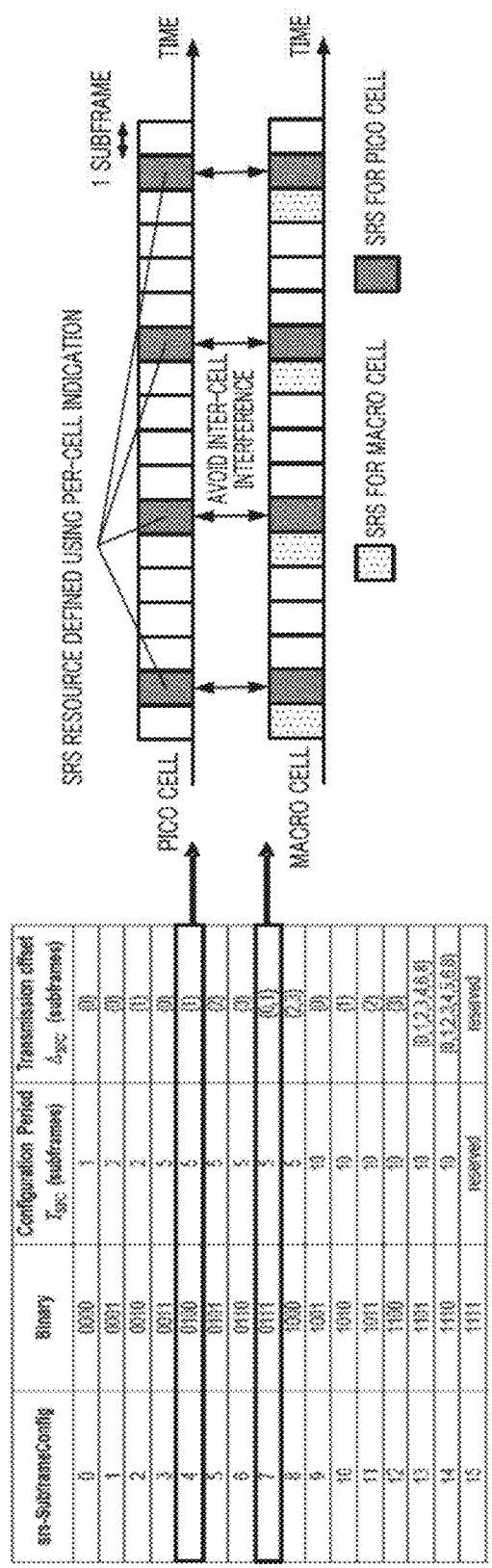
FIG. 4 illustrates a desired SRS resource candidate group.
Figure 5:
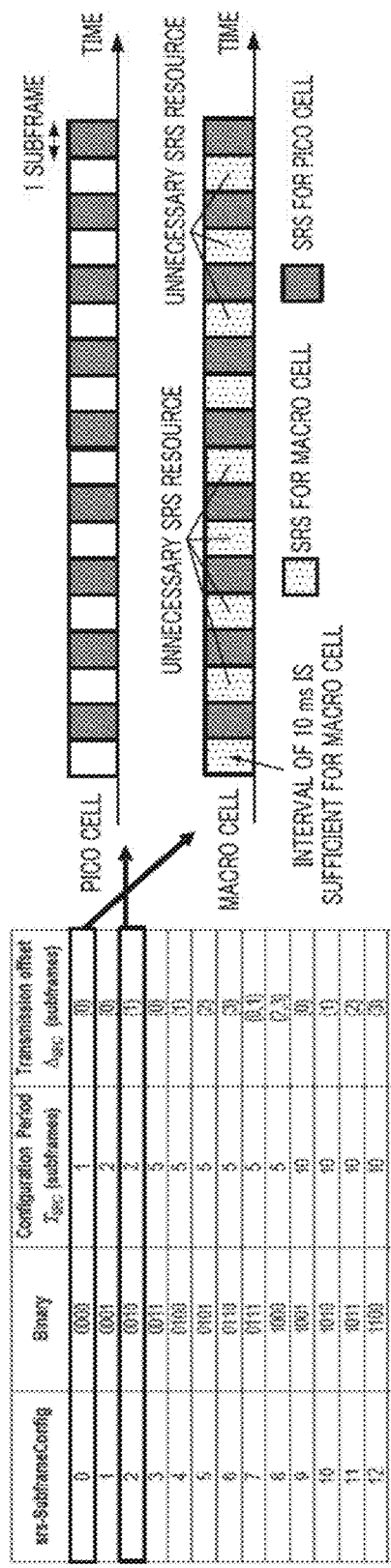
FIG. 5 illustrates excessive SRS resources.

Embodiments of the present invention will be described in detail below with reference to the accompanying drawings. It should be noted that in the embodiments, identical reference numerals are assigned to identical components and explanation thereof is omitted for avoiding overlap.

Embodiment 1

[Summary of Communication System]

A communication system according to Embodiment 1 of the present invention is configured with a plurality of transmitting apparatuses and a plurality of receiving apparatuses. Each receiving apparatus has an area covered by a cell provided by the receiving apparatus itself. Each transmitting apparatus transmits a reference signal to the receiving apparatus which provides the cell that covers the area where the transmitting apparatus is located. Here, explanation will be provided assuming that the receiving apparatus which provides a cell covering an interfering area (i.e., an interfering cell) that provides interference by transmission of the reference signal is base station 100 and the transmitting apparatus which is located in the interfering cell provided by base station 100 is terminal 200. Further, explanation will be provided assuming that the interfering cell is a macro cell and an interfered cell is a pico cell. For example, the communication system is an LTE-A system, base station 100 is an LTE-A base station, and terminal 200 is an LTE-A terminal.

Figure 6:
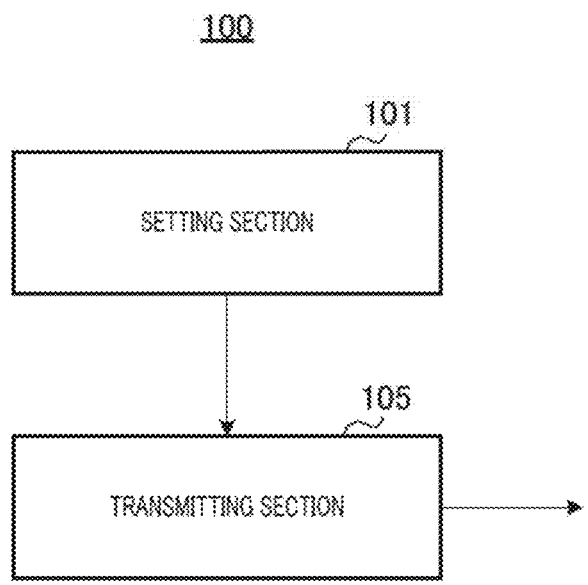
FIG. 6 is a block diagram illustrating the main configuration of a base station according to Embodiment 1 of the present invention.

FIG. 6 is a block diagram illustrating the main configuration of base station 100 according to Embodiment 1 of the present invention. Base station 100 shown in FIG. 6 receives a reference signal (for example, a P-SRS) transmitted using a resource candidate which belongs to a first desired resource candidate group from terminal 200 located in a first area (i.e., an interfering area). The "first desired resource candidate group" described here corresponds to a desired SRS resource candidate group in a macro cell which will be described later. Setting section 101 sets a reference signal resource candidate group including the first desired resource candidate group and a second desired resource candidate group in a second area (i.e., an interfered area) which is subjected to interference from the first area by a data signal (or the reference signal). The "second desired resource candidate group" described here is a desired SRS resource candidate group in a pico cell which will be described later. Further, the "reference signal resource candidate group" described here corresponds to a first SRS resource candidate group which will be described later. Setting section 101 generates release information for releasing an excessive resource (here, corresponding to an excessive SRS resource which will be described later) which is included in the reference signal resource candidate group but is not included in the first desired resource candidate group from the reference signal resource candidate group. Transmitting section 105 transmits identification information of a resource pattern for identifying the reference signal resource candidate group and the release information to terminal 200.

Figure 7:
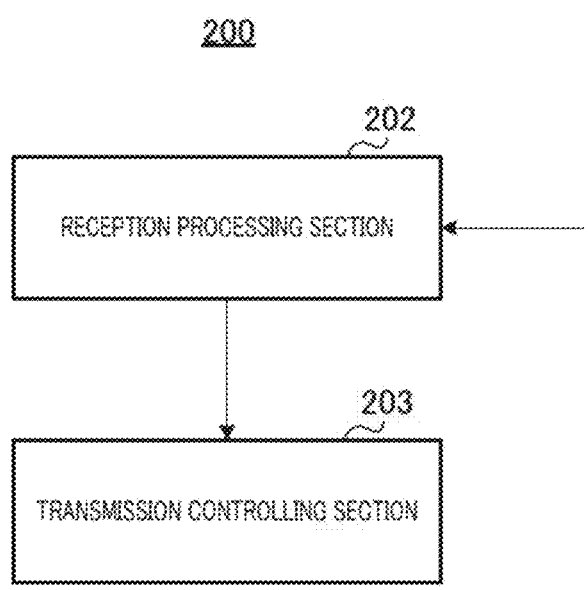
FIG. 7 is a block diagram illustrating the main configuration of a terminal according to Embodiment 1 of the present invention.

FIG. 7 is a block diagram illustrating the main configuration of terminal 200 according to Embodiment 1 of the present invention. Terminal 200 shown in FIG. 7 transmits a reference signal (for example, a P-SRS) to base station 100 which provides the cell covering the first area (i.e., an interfering area) using a resource candidate which belongs to the first desired resource candidate group. The first desired resource candidate group described here corresponds to a desired SRS resource candidate group in the macro cell which will be described later. Reception processing section 202 extracts identification information of the resource pattern and release information from a signal transmitted from base station 100. The "identification information of the resource pattern" described here is information for identifying a reference signal resource candidate group including the second desired resource candidate group in the second area (i.e., an interfered area). Further, the "second area" described here is an area which is subjected to interference from the first area by the first desired resource candidate group and the reference signal. Further, the "second desired resource candidate group" described here is a desired SRS resource candidate group in the pico cell which will be described later. Still further, the "reference signal resource candidate group" described here corresponds to the first SRS resource candidate group which will be described later. Further, the "release information" described here is information for releasing an excessive resource which is included in the reference signal resource candidate group but is not included in the first desired resource candidate group from the reference signal resource candidate group. Still further, the "excessive resource" described here corresponds to an excessive SRS resource which will be described later. Transmission controlling section 203 identifies the first desired resource candidate group based on the identification information of the resource pattern for identifying the reference signal resource candidate group and the release information.

[Configuration of Base Station 100]

Figure 8:
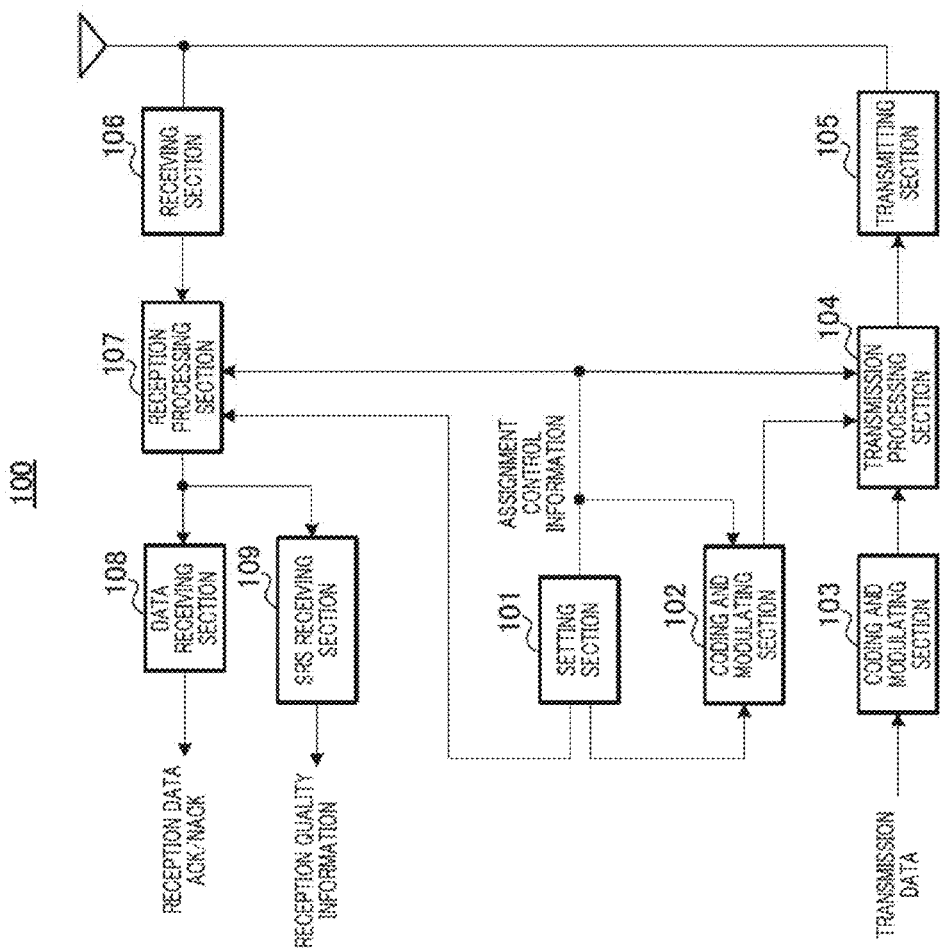
FIG. 8 is a block diagram illustrating a configuration of the base station according to Embodiment 1 of the present invention.

FIG. 8 is a block diagram illustrating the configuration of base station 100 according to Embodiment 1 of the present invention. In FIG. 8, base station 100 has setting section 101, coding and modulating sections 102 and 103, transmission processing section 104, transmitting section 105, receiving section 106, reception processing section 107, data receiving section 108 and SRS receiving section 109.

Setting section 101 determines a desired SRS resource candidate group in the macro cell taking into account the amount of SRS resources necessary for each of plurality of terminals 200 located in the macro cell served by base station 100 and pico cell interference. Setting section 101 sets the first SRS resource candidate group based on the determined desired SRS resource candidate group in the macro cell and the desired SRS resource candidate group in the pico cell. The first SRS resource candidate group set here includes both the desired SRS resource candidate group in the macro cell and the desired SRS resource candidate group in the pico cell. Setting section 101 selects identification information of an SRS resource pattern corresponding to the set first SRS resource candidate group from an "SRS resource pattern table." The "SRS resource pattern table" is, for example, a table illustrated in FIG. 1.

Information relating to the desired SRS resource candidate group in the macro cell determined by setting section 101 is output to reception processing section 107. Further, the selected identification information of the SRS resource pattern is indicated to all the terminals (i.e., terminal 200 which is an LTE-A terminal and an LTE terminal) located in the macro cell through coding and modulating section 102, transmission processing section 104 and transmitting section 105. In other words, the identification information of the SRS resource pattern is indicated by the above-described first per-cell indication.

Further, when there is an SRS resource candidate (i.e., an excessive SRS resource) which is an SRS resource candidate identified by the selected SRS resource pattern and which is not included in the desired SRS resource candidate group in the macro cell, setting section 101 generates "release information" for releasing the excessive SRS resource from the SRS resource candidates.

Specifically, setting section 101 holds a "release pattern table". In the "release pattern table", a plurality of items of identification information and "release resource pattern candidates" corresponding to each of the items of the identification information are associated. Each of the release resource pattern candidates is represented by a "release pattern bit sequence". The "release pattern bit sequence" includes a number of bits that is identical to the number of subframes included in one frame, and each of the bits included in the bit sequence indicates whether or not to release the corresponding subframe from a state of being an SRS transmission candidate subframe. Setting section 101 selects a release resource pattern candidate which allows only excessive SRS resources to be released from the state of being the SRS transmission candidate subframe, without excessively or insufficiently releasing SRS resources, and sets the identification information associated with the selected release resource pattern candidate as "release information". That is, the "release information" in Embodiment 1 is information which indicates the positions of the excessive SRS resources in one frame. This "release information" is indicated to part of terminals (i.e., terminal 200 which is an LTE-A terminal) located in the macro cell through coding and modulating section 102, transmission processing section 104 and transmitting section 105. Hereinafter, the indication to part of the terminals located in the macro cell is referred to as a "second per-cell indication."

Further, setting section 101 assigns a plurality of SRS resource candidates constituting the first SRS resource candidate group or the desired SRS resource candidate group in the macro cell to terminals to which SRS resources are to be assigned. Information relating to the SRS resources (per-terminal SRS resources) assigned to the terminals by setting section 101 is output to reception processing section 107. Further, indication information relating to the per-terminal SRS resources is indicated to terminals located in the macro cell (i.e., terminal 200 which is an LTE-A terminal and an LTE terminal) through coding and modulating section 102, transmission processing section 104 and transmitting section 105. That is, the indication information relating to the per-terminal SRS resources is indicated to each terminal by a higher layer indication.

Still further, setting section 101 generates assignment control information including resource (RB) assignment information and MCS information for one or a plurality of transport blocks (TB). Assignment control information is comprised of assignment control information relating to an uplink resource (for example, PUSCH) to which uplink data is assigned and assignment control information relating to a downlink resource (for example, PDSCH) to which downlink data is assigned. The assignment control information relating to the uplink resource is output to coding and modulating section 102 and reception processing section 107, while the assignment control information relating to the downlink resource is output to coding and modulating section 102 and transmission processing section 104.

Coding and modulating section 102 encodes and modulates the identification information of the SRS resource pattern, the release information and the assignment control information received from setting section 101 and outputs the obtained modulation signal to transmission processing section 104. The identification information of the SRS resource pattern and the release information are encoded and modulated as higher layer information (RRC signaling) which has a long indication interval, while the assignment control information is encoded and modulated as PDCCH (Physical Downlink Control CHannel) information which has a short indication interval.

Coding and modulating section 103 encodes and modulates the input data signal and outputs the obtained modulation signal to transmission processing section 104.

Transmission processing section 104 maps the modulation signals received from coding and modulating section 102 and coding and modulating section 103 to resources designated in the downlink resource assignment information received from setting section 101, thereby forming a transmission signal. Here, when the transmission signal is an OFDM signal, transmission processing section 104 forms an OFDM signal by mapping the modulation signals to resources designated in the downlink resource assignment information received from setting section 101, performing inverse fast Fourier transform (IFFT) processing to convert the waveform into a time waveform and adding a CP (Cyclic Prefix).

Transmitting section 105 performs radio transmission processing (such as up-conversion and digital/analog (D/A) conversion) on the transmission signal received from transmission processing section 104 and transmits the signal through an antenna.

Receiving section 106 performs radio reception processing (such as down-conversion and analog/digital (A/D) conversion) on the radio signal received through an antenna and outputs the obtained reception signal to reception processing section 107.

Reception processing section 107 identifies a resource to which an uplink data signal and ACK/NACK information are mapped based on information relating to the desired SRS resource candidate group in the macro cell and the uplink resource assignment information received from setting section 101, and extracts a signal component mapped to the identified resource from the reception signal. Specifically, reception processing section 107 extracts the signal component taking into account that a last symbol is an SRS resource in a case of the desired SRS resource candidate group in the macro cell, otherwise, taking into account that the last symbol is a resource of a data signal.

Reception processing section 107 identifies the resource to which the P-SRS is mapped based on the information relating to the desired SRS resource candidate group and the information relating to the per-terminal SRS resources received from setting section 101, and extracts the signal component mapped to the identified resource from the reception signal. Here, when the reception signal is an OFDM signal, reception processing section 107 performs IDFT (Inverse Discrete Fourier Transform) processing on the extracted signal component to thereby convert the reception signal into a time domain signal.

The uplink data signal and the ACK/NACK information extracted by reception processing section 107 in this way are output to data receiving section 108, and the SRS is output to SRS receiving section 109.

Data receiving section 108 decodes the signal received from reception processing section 107 to thereby obtain the uplink data and the ACK/NACK information.

SRS receiving section 109 measures reception quality of each frequency resource unit based on the SRS received from reception processing section 107 and outputs the reception quality information.

When a traffic state does not change in a cell of base station 100 or when it is desired to measure average reception quality, the first per-cell indication and the second per-cell indication are preferably indicated using higher layer information which has a longer indication interval from the aspect of signaling. Further, by performing indication of part or all of the first per-cell indication and the second per-cell indication as broadcast information, it is possible to reduce the amount of indication. However, when it is necessary to dynamically change the first per-cell indication and the second per-cell indication according to the traffic state, or the like, it is also possible to perform indication of part or all of the first per-cell indication and the second per-cell indication using a PDCCH which has a shorter indication interval.

[Configuration of Terminal 200]

Figure 9:
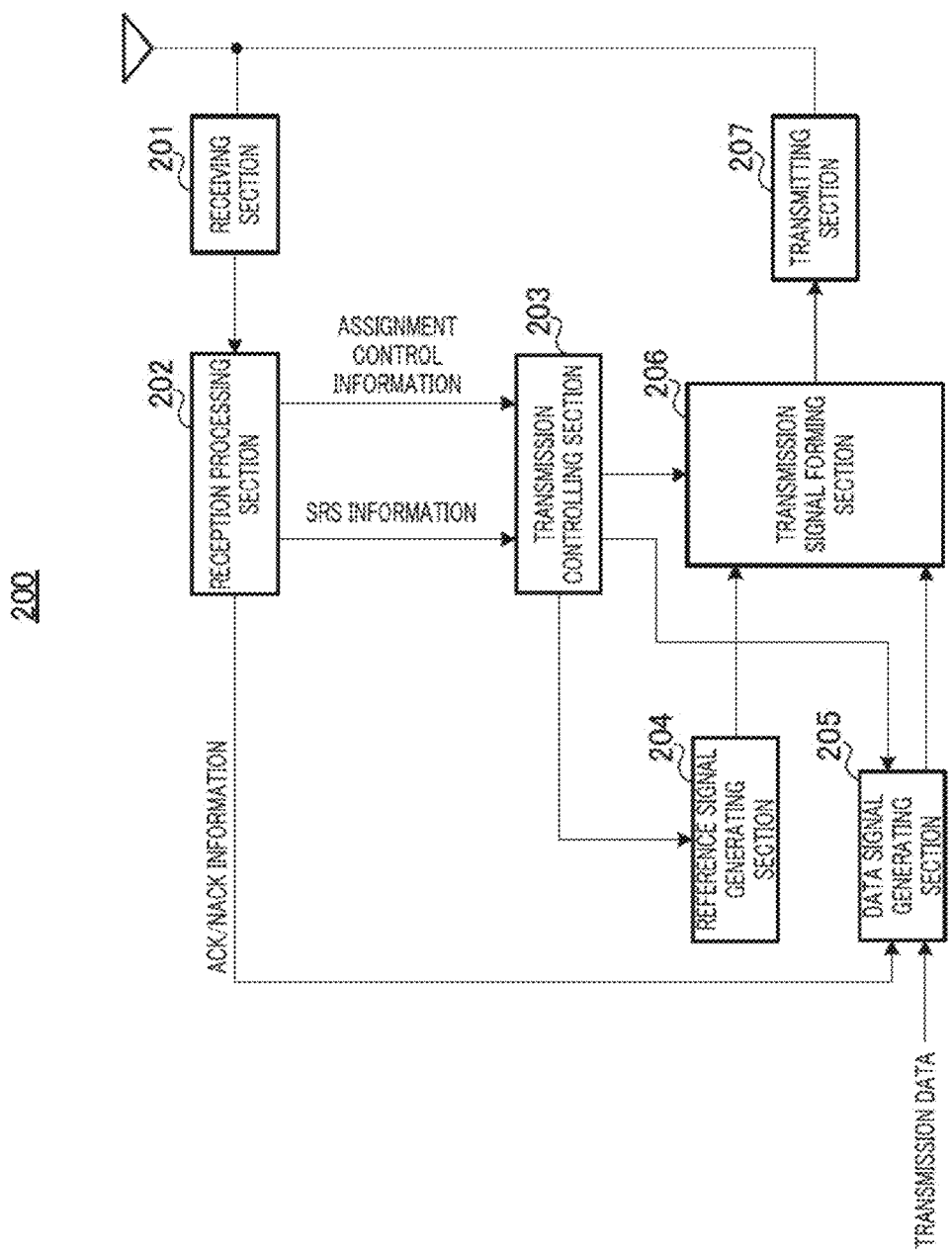
FIG. 9 is a block diagram illustrating a configuration of the terminal according to Embodiment 1 of the present invention.

FIG. 9 is a block diagram illustrating a configuration of terminal 200 according to Embodiment 1 of the present invention. In FIG. 9, terminal 200 has receiving section 201, reception processing section 202, transmission controlling section 203, reference signal generating section 204, data signal generating section 205, transmission signal forming section 206 and transmitting section 207.

Receiving section 201 performs radio reception processing (such as down-conversion, analog/digital (A/D) conversion) on a radio signal received via an antenna and outputs the obtained reception signal to reception processing section 202.

Reception processing section 202 extracts a first per-cell indication, a second per-cell indication, information relating to per-terminal SRS resources, assignment control information and a data signal included in the reception signal. That is, reception processing section 202 extracts identification information of an SRS resource pattern, release information, information relating to the per-terminal SRS resources, the assignment control information and the data signal included in the reception signal.

Reception processing section 202 outputs the identification information of the SRS resource pattern, the release information, the information relating to the per-terminal SRS resources and the assignment control information to transmission controlling section 203. Further, reception processing section 202 performs error detection processing on the extracted data signal and outputs ACK/NACK information according to the error detection result to data signal generating section 205.

Transmission controlling section 203 identifies a desired SRS resource candidate group in a macro cell based on the identification information of the SRS resource pattern and the release information received from reception processing section 202 and an SRS resource pattern table. The SRS resource pattern table held in a memory of transmission controlling section 203 is the same as that held in the memory of setting section 101 of base station 100.

Specifically, first, transmission controlling section 203 identifies a first SRS resource candidate group based on the identification information of the SRS resource pattern received from reception processing section 202 and the SRS resource pattern table. That is, in the SRS resource pattern table, the identification information of a plurality of SRS resource pattern candidates is associated with SRS resource pattern parameters (i.e., transmission interval TSFC, offset amount ΔSFC) corresponding to the identification information of the SRS resource pattern candidates. Transmission controlling section 203 identifies an SRS resource pattern candidate which matches the identification information of the SRS resource pattern received from reception processing section 202 and identifies an SRS resource pattern based on the SRS resource pattern parameter associated with the SRS resource pattern candidate. The identified SRS resource pattern indicates the first SRS resource candidate group.

Secondly, transmission controlling section 203 identifies the desired SRS resource candidate group in the macro cell based on the identified SRS resource pattern and the release information received from reception processing section 202.

Specifically, transmission controlling section 203 generates a "pattern bit sequence" based on the identified SRS resource pattern. The "pattern bit sequence" includes a number of bits that is identical to the number of subframes included in one frame, and each bit included in the bit sequence indicates whether or not the corresponding subframe is an SRS transmission candidate subframe. Further, transmission controlling section 203 generates a "release pattern bit sequence" based on the release information and a release pattern table. The release pattern table is the same as that held in setting section 101 of base station 100. Transmission controlling section 203 performs a logical AND operation of the pattern bit sequence and the release pattern bit sequence (or uses a correspondence relationship between two types of bit sequences) to thereby generate a "desired pattern bit sequence." This "desired pattern bit sequence" indicates positions of the desired SRS resource candidates in one frame, which constitute the desired SRS resource candidate group. Accordingly, transmission controlling section 203 can identify the desired SRS resource candidate group in the macro cell based on the desired pattern bit sequence.

Further, transmission controlling section 203 identifies an SRS resource to be used by terminal 200 (per-terminal SRS resources) from the desired SRS resource candidate group based on the information relating to the per-terminal SRS resources.

Transmission controlling section 203 outputs an SRS generation instruction to reference signal generating section 204, outputs information relating to the identified desired SRS resource candidate group in the macro cell to data signal generating section 205 and transmission signal forming section 206 and outputs the information relating to the per-terminal SRS resources to transmission signal forming section 206. Further, transmission controlling section 203 outputs MCS information included in the assignment control information to data signal generating section 205.

Still further, transmission controlling section 203 identifies a time frequency resource to which terminal 200 maps the data signal. Specifically, transmission controlling section 203 identifies the time frequency resource (hereinafter, referred sometimes to as a "data mapping resource") based on the assignment information received from reception processing section 202. Transmission controlling section 203 outputs information relating to the data mapping resource to transmission signal forming section 206. It should be noted that the data mapping resource depends on the desired SRS resource candidate group in the macro cell.

When receiving the SRS generation instruction from transmission controlling section 203, reference signal generating section 204 generates a P-SRS and outputs the P-SRS to transmission signal forming section 206.

Data signal generating section 205 receives the ACK/NACK information and transmission data as input, and encodes and modulates the ACK/NACK information and the transmission data based on the MCS information received from transmission controlling section 203, thereby generating a data signal. Here, data signal generating section 205 determines whether or not to transmit the data signal using a last symbol based on the information relating to the desired SRS resource candidate group in the macro cell input from transmission controlling section 203 and performs encoding and modulation processing taking into account the number of symbols which can be transmitted. Specifically, when the data signal is not transmitted using the last symbol, data signal generating section 205 increases a coding rate and/or a modulation level compared to a case where the data signal is transmitted using the last symbol.

Transmission signal forming section 206 maps the SRS received from reference signal generating section 204 to the SRS mapping resource (that is, the last symbol) which is the SRS resource to be used by terminal 200 in the desired SRS resource candidates constituting the desired SRS resource candidate group in the macro cell received from transmission controlling section 203. Further, transmission signal forming section 206 maps the data signal received from data signal generating section 205 to the data mapping resource. Accordingly, the transmission signal is formed.

Transmitting section 207 performs radio transmission processing (such as up-conversion and digital/analog (D/A) conversion) on the transmission signal formed at transmission signal forming section 206 and transmits the transmission signal via the antenna.

[Operation of Base Station 100 and Terminal 200]

Figure 10:
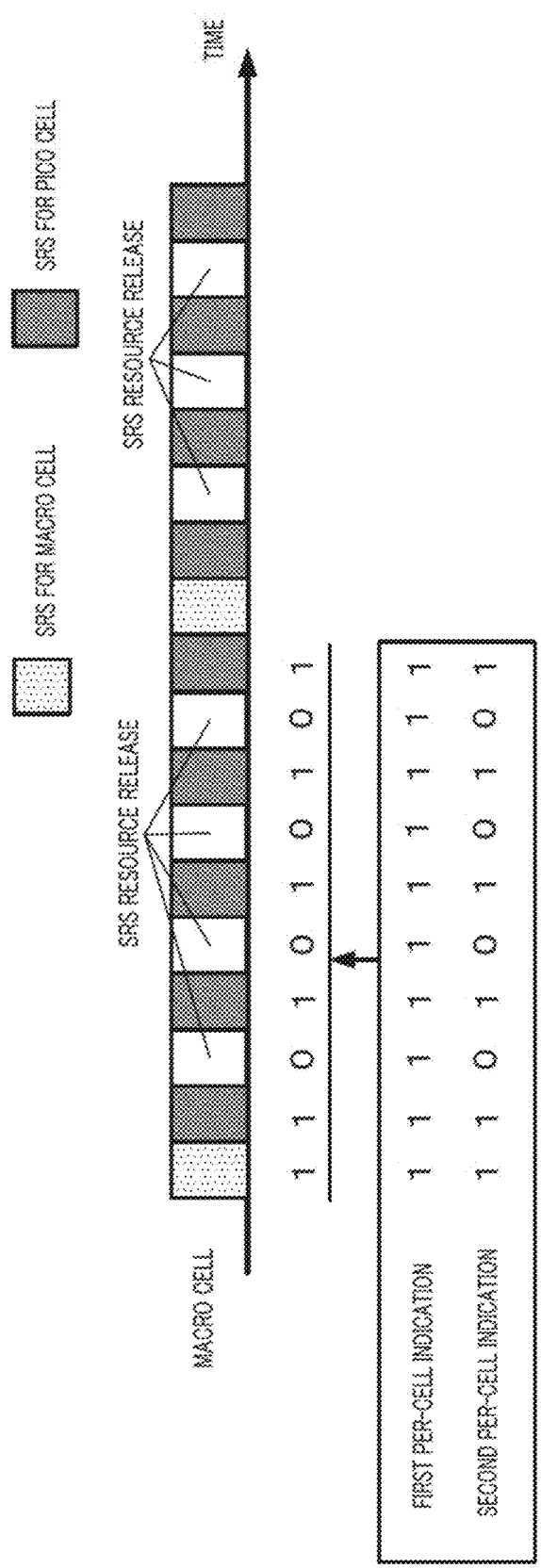
FIG. 10 illustrates operation of the base station and the terminal.

The operation of base station 100 and terminal 200 having the above-described configurations will be described. FIG. 10 illustrates the operation of base station 100 and terminal 200.

In base station 100, the first SRS resource candidate group is set based on the desired SRS resource candidate group in the macro cell and the desired SRS resource candidate group in the pico cell. Here, the set first SRS resource candidate group includes both the desired SRS resource candidate group in the macro cell and the desired SRS resource candidate group in the pico cell. Setting section 101 selects the identification information of the SRS resource pattern corresponding to the set first SRS resource candidate group from the "SRS resource pattern table."

Further, when there is an SRS resource candidate (i.e., an excessive SRS resource) which is an SRS resource candidate identified by the selected SRS resource pattern, and which is not included in the desired SRS resource candidate group in the macro cell, setting section 101 generates "release information" for releasing the excessive SRS resource from the SRS resource candidates.

The set first SRS resource candidate group is indicated from base station 100 to terminal 200 using the first per-cell indication, and the release information is indicated from base station 100 to terminal 200 using the second per-cell indication.

In terminal 200, reception processing section 202 extracts the identification information of the SRS resource pattern and the release information included in the reception signal.

Transmission controlling section 203 identifies the first SRS resource candidate group based on the identification information of the SRS resource pattern received from reception processing section 202 and the SRS resource pattern table. Transmission controlling section 203 identifies the SRS resource pattern candidate which matches the identification information of the SRS resource pattern received from reception processing section 202 and identifies the SRS resource pattern based on the SRS resource pattern parameter associated with the resource pattern candidate. Transmission controlling section 203 generates a "pattern bit sequence" (corresponding to a bit sequence of "1, 1, 1, 1, 1, 1, 1, 1, 1, 1" illustrated beside the "first per-cell indication" in FIG. 10) based on the identified SRS resource pattern. In FIG. 10, in the "pattern bit sequence," a bit value of 1 indicates that the bit is the SRS resource pattern candidate, and a bit value of 0 indicates that the bit is not the SRS resource pattern candidate.

Further, transmission controlling section 203 generates a "release pattern bit sequence" (corresponding to a bit sequence illustrated beside the "second per-cell indication" in FIG. 10) based on the release information and the release pattern table. In FIG. 10, in the "release pattern bit sequence," a bit value of 0 indicates that the subframe is a release target subframe and a bit value of 1 indicates that the subframe is not the release target subframe.

Transmission controlling section 203 performs a logical AND operation of the pattern bit sequence and the release pattern bit sequence, thereby generating a "desired pattern bit sequence." The "desired pattern bit sequence" (corresponding to the bit sequence of "1, 1, 0, 1, 0, 1, 0, 1, 0, 1" in FIG. 10) indicates positions of the desired SRS resource candidates constituting the desired SRS resource candidate group in one frame. Accordingly, transmission controlling section 203 can identify the desired SRS resource candidate group in the macro cell based on the desired pattern bit sequence.

As described above, according to this embodiment, in base station 100, setting section 101 sets a reference signal resource candidate group (here, corresponding to the first SRS resource candidate group) including the first desired resource candidate group (here, corresponding to the desired SRS resource candidate group in the macro cell) and the second desired resource candidate group (here, corresponding to the desired SRS resource candidate group in the pico cell) in the second area (i.e., the interfered area) which is subjected to interference from the first area (i.e., the interfering area) by the reference signal. Setting section 101 generates release information for releasing an excessive resource (here, corresponding to an excessive SRS resource which will be described later) which is included in the reference signal resource candidate group but is not included in the first desired resource candidate group from the reference signal resource candidate group. The identification information of the resource pattern for identifying the reference signal resource candidate group and the release information are transmitted to terminal 200.

Further, according to this embodiment, in terminal 200, reception processing section 202 extracts the identification information of the resource pattern for identifying the reference signal resource candidate group (here, corresponding to the first SRS resource candidate group) including the first desired resource candidate group (here, corresponding to the desired SRS resource candidate group in the macro cell) and the second desired resource candidate group (here, corresponding to the desired SRS resource candidate group in the pico cell) in the second area (i.e., the interfered area) which is subjected to interference from the first area by the reference signal, and the release information for releasing the excessive resource (here, corresponding to the excessive SRS resource) which is included in the reference signal resource candidate group but is not included in the first desired resource candidate group from the reference signal resource candidate group, from the signal transmitted from base station 100. Transmission controlling section 203 identifies the first desired resource candidate group based on the identification information of the resource pattern for identifying the reference signal resource candidate group and the release information.

In this manner, it is possible to release the excessive resource from a state of being the reference signal resource candidate in the interfering area. That is, it is possible to improve flexibility of setting of the resource candidates to be utilized for transmission of the reference signal.

It should be noted that a terminal which cannot read the second per-cell indication but can read only the first per-cell indication (i.e., an LTE terminal) transmits a data signal using a last symbol of a subframe which is not included in the first SRS resource candidate group. When the subframe which is not included in the first SRS resource candidate group can be included in the reference signal resource candidate group, terminal 200 which can read the second per-cell indication transmits an SRS using the last symbol of the subframe. As a result, the data signal transmitted from the terminal which can only read the first per-cell indication (i.e., the LTE terminal) collides with the SRS transmitted from terminal 200. This collision, which can be basically avoided by scheduling by base station 100, may occur as a result of a reception error, or the like. However, when the first SRS resource candidate group includes the reference signal resource candidate group as in Embodiment 1, it is possible to reduce possibilities of occurrence of the above-described collision.

Figure 11:
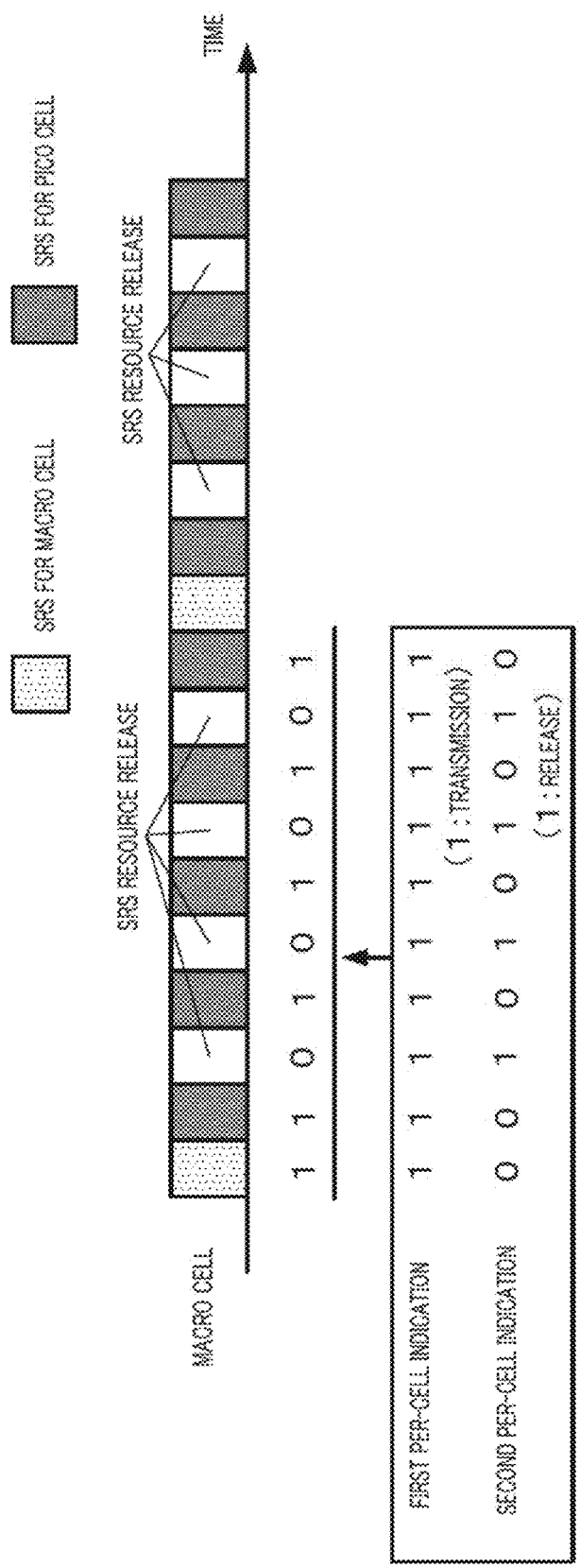
FIG. 11 illustrates a method for generating a desired pattern bit sequence.

In the above description, in the "release pattern bit sequence," the bit value of 0 indicates that the subframe is the release target subframe, and the bit value of 1 indicates that the subframe is not the release target subframe. The "desired pattern bit sequence" is generated by calculating the AND of the pattern bit sequence and the release pattern bit sequence. However, the present invention is not limited to this, and it is also possible to constitute the "release pattern bit sequence" so that the bit value of 1 indicates that the subframe is the release target subframe, and the bit value of 0 indicates that the subframe is not the release target subframe. In this case, the "desired pattern bit sequence" is generated by performing an exclusive OR operation of the pattern bit sequence and the release pattern bit sequence (see FIG. 11).

Further, while, in the above description, the identification information associated with the release pattern bit sequence in the release pattern table is used as the release information, the present invention is not limited to this, and it is also possible to directly use the release pattern bit sequence as the release information. By directly using the release pattern bit sequence as the release information in this way, it is possible to flexibly set the desired SRS resource candidate group in the macro cell. It is also possible to indicate the identification information of the SRS resource pattern using the same method as in the LTE (i.e., using the first per-cell indication). Accordingly, it is possible to reduce the number of bits necessary for indication.

Embodiment 2

In Embodiment 1, the identification information associated with the selected release resource pattern candidate in the release pattern table is used as the release information. Meanwhile, in Embodiment 2, the identification information of two SRS resource patterns in the SRS resource pattern table is used as the release information. It should be noted that because a base station and a terminal according to Embodiment 2 are the same as base station 100 and terminal 200 according to Embodiment 1, the explanation will be described using FIG. 8 and FIG. 9.

In base station 100 in Embodiment 2, when there is an SRS resource candidate which is an SRS resource candidate identified by the selected SRS resource pattern but is not included in the desired SRS resource candidate group in the macro cell (i.e., an excessive SRS resource), setting section 101 generates "release information." The "release information" described here is information for releasing the excessive SRS resource from the SRS resource candidates.

Specifically, setting section 101 selects a pair of two SRS resource pattern candidates which can establish a release resource pattern to be applied to the first SRS resource candidate group from the SRS resource pattern table. Setting section 101 sets two items of identification information corresponding to the selected two SRS resource pattern candidates as the release information. In more details, setting section 101 sets a connected bit sequence where bit sequences respectively representing the two items of identification information are connected as the release information. As shown in FIG. 1, the identification information corresponding to the SRS resource pattern candidate is represented by four bits, the release information is configured with eight bits.

Here, the selected two items of identification information respectively correspond to the SRS resource pattern candidate which matches the desired SRS resource candidate group in the pico cell and the SRS resource pattern candidate which matches the desired SRS resource candidate group in the macro cell.

In terminal 200 in Embodiment 2, transmission controlling section 203 receives the release information as input. The release information is, as described above, the connected bit sequence where the bit sequences respectively representing the two items of identification information are connected. Accordingly, transmission controlling section 203 sets the release information as the release pattern bit sequence and performs a logical AND operation of the pattern bit sequence and the release pattern bit sequence, thereby generating the "desired pattern bit sequence."

Figures 12A, 12B:
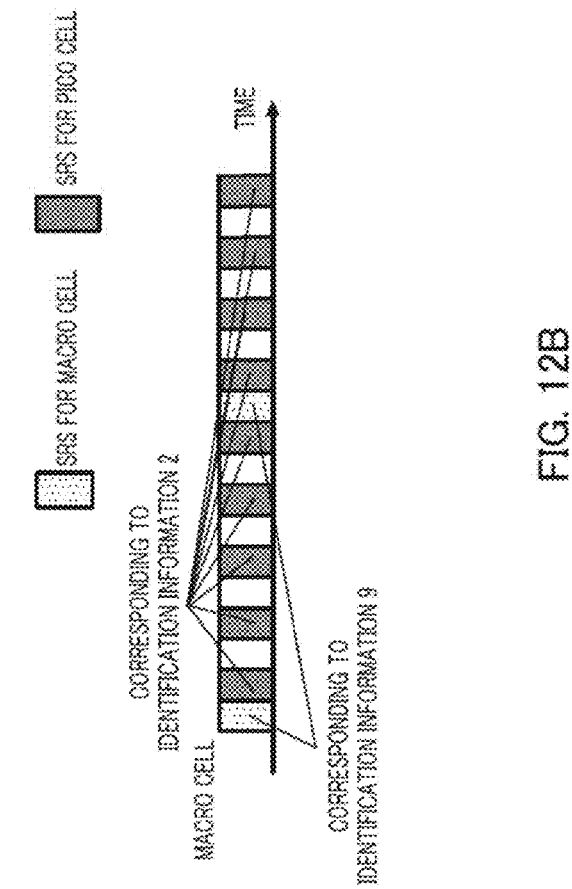
FIG. 12A and FIG. 12B illustrate operation of a base station and a terminal according to Embodiment 2 of the present invention.

The operation of base station 100 and terminal 200 of Embodiment 2 will be described below using a specific example. FIGS. 12A and 12B illustrate the operation of base station 100 and terminal 200 of Embodiment 2.

When SRS transmission with an interval of 10 ms is planned in the macro cell, and SRS transmission with an interval of 2 ms is planned in the pico cell, the following operation is performed in each cell. That is, in the pico cell, 2 (transmission interval TSFC=interval of 2 ms, offset amount ΔSFC=1) is selected as the identification information of the SRS resource pattern (i.e., srs-SubframeConfig), while, in the macro cell, 0 (transmission interval TSFC=interval of 1 ms, offset amount ΔSFC=0) is selected as the identification information of the SRS resource pattern (i.e., srs-SubframeConfig).

Setting section 101 selects a pair of two SRS resource pattern candidates which can establish a release resource pattern to be applied to the first SRS resource candidate group from the SRS resource pattern table. Specifically, as shown in FIG. 12A, the SRS resource pattern candidate (transmission interval TSFC=interval of 2 ms, offset amount ΔSFC=1) where the identification information of the SRS resource pattern (i.e., srs-SubframeConfig) is 2 is selected as the first SRS resource pattern candidate. Further, the SRS resource pattern candidate (transmission interval TSFC=interval of 10 ms, offset amount ΔSFC=0) where the identification information of the SRS resource pattern (i.e., srs-SubframeConfig) is 9 is selected as the second SRS resource pattern candidate. That is, the selected two items of identification information respectively correspond to the SRS resource pattern candidate which matches the desired SRS resource candidate group in the pico cell and the SRS resource pattern candidate which matches the desired SRS resource candidate group in the macro cell.

Setting section 101 sets the two items of identification information corresponding to the selected two SRS resource pattern candidates as the release information. Specifically, setting section 101 sets the connected bit sequence where the bit sequences respectively representing the two items of identification information are connected as the release information. That is, in the example illustrated in FIG. 12A, the release information has eight bits obtained by connecting the identification information of "0010" representing the first SRS resource pattern candidate of "0, 1, 0, 1, 0, 1, 0, 1, 0, 1" and the identification information of "1001" representing the second SRS resource pattern candidate of "1, 0, 0, 0, 0, 0, 0, 0, 0, 0." The release information represents the release pattern bit sequence of "1, 1, 0, 1, 0, 1, 0, 1, 0, 1" which is the AND of the first SRS resource pattern candidate and the second SRS resource pattern candidate. Here, the bit value of 0 indicates that the subframe is the release target subframe, and the bit value of 1 indicates that the subframe is not the release target subframe. Meanwhile, the "pattern bit sequence" is "1, 1, 1, 1, 1, 1, 1, 1, 1, 1."

Accordingly, transmission controlling section 203 sets the release information as the release pattern bit sequence and calculates the AND of the pattern bit sequence and the release pattern bit sequence, thereby generating the "desired pattern bit sequence". This desired pattern bit sequence indicates the desired SRS resource candidate group (here, subframes #0, #1, #3, #5, #7, #9) in the macro cell.

As described above, according to this embodiment, control information generated in setting section 101 of base station 100 is the identification information of the two resource patterns among the resource patterns for identifying the reference signal resource candidate group. Specifically, the identification information of two SRS resource patterns in the SRS resource pattern table is used as the release information. By this means, the SRS setting method in the LTE can be utilized, so that it is possible to prevent increase of the circuit scale of terminal 200 to which setting is applied.

Embodiment 3

While in Embodiment 2, the description has been provided assuming that the whole SRS resource pattern table is used to generate the release information, in Embodiment 3, only part of the plurality of SRS resource pattern candidates in the SRS resource pattern table is used to generate the release information. In other words, in Embodiment 3, a partial table of the SRS resource pattern table is used to generate the release information. Because a base station and a terminal according to Embodiment 3 are the same as base station 100 and terminal 200 according to Embodiment 1, the description will be provided using FIG. 8 and FIG. 9.

In base station 100 of Embodiment 3, when there is an SRS resource candidate which is the SRS resource candidate identified by the selected SRS resource pattern and which is not included in the desired SRS resource candidate group in the macro cell (i.e., an excessive SRS resource), setting section 101 generates "release information." The "release information" described here is information for releasing the excessive SRS resource from the SRS resource candidates.

Specifically, setting section 101 selects a pair of two SRS resource pattern candidates which can establish a release resource pattern to be applied to the first SRS resource candidate group from the "partial table of SRS resource pattern table." Setting section 101 sets two items of identification information corresponding to the selected two SRS resource pattern candidates as the release information. Specifically, setting section 101 sets a connected bit sequence where bit sequences respectively representing the two items of identification information are connected as the release information.

Here, in the plurality of SRS resource patterns specified in the SRS resource pattern table, SRS resource patterns which are frequently used and SRS resource patterns which are less frequently used are mixed. For example, when the SRS is transmitted using all the subframes in the macro cell, no subframe for transmitting the SRS remains in the pico cell. Therefore, the SRS resource pattern candidate (transmission interval TSFC=interval of 1 ms, offset amount ΔSFC=0) where the identification information of the SRS resource pattern (i.e., srs-SubframeConfig) is 0 is less frequently used.

For the same reason, the SRS resource pattern candidate which has an extremely large number of subframes used for transmitting the SRS, is less frequently used. For example, the SRS resource pattern candidate (transmission interval TSFC=interval of 10 ms, offset amount ΔSFC=0, 1, 2, 3, 4, 6, 8) where the identification information of the SRS resource pattern (i.e., srs-SubframeConfig) is 13, and the SRS resource pattern candidate (transmission interval TSFC=interval of 10 ms, offset amount ΔSFC=0,1, 2, 3, 4, 5, 6, 8) where the identification information of the SRS resource pattern is 14 are less frequently used.

Therefore, as the "partial table of the SRS resource pattern table", for example, as shown in FIG. 13, it is possible to use a table obtained by removing the SRS resource pattern candidates where the identification information of the SRS resource patterns is 0, 13 and 14 from the SRS resource pattern table.

Figure 14:
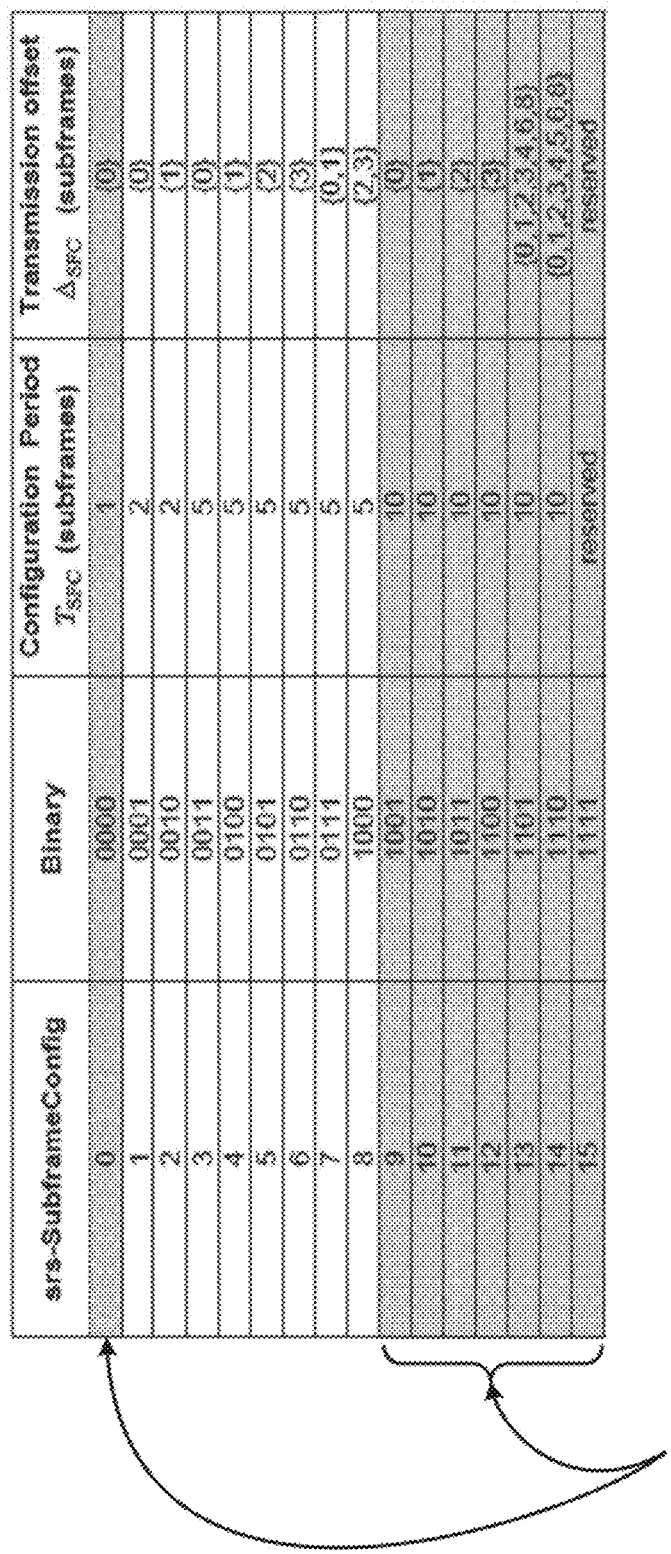
FIG. 14 is an example of a partial table of the SRS resource pattern table according to Embodiment 3 of the present invention.

Further, as shown in FIG. 14, it is also possible to use the "partial table of the SRS resource pattern table" obtained by further removing the identification information of the SRS resource patterns which are less frequently used from the SRS resource pattern table. In the example shown in FIG. 14, because the number of items of the identification information of the SRS resource patterns in the "partial table of the SRS resource pattern table" is limited to eight, the identification information corresponding to the SRS resource pattern candidates can be represented with three bits. Accordingly, the release information can be configured with six bits, so that it is possible to reduce the number of bits necessary for indication.

In terminal 200 of Embodiment 3, transmission controlling section 203 receives the release information as input. This release information is, as described above, the connected bit sequence where the bit sequences respectively representing the two items of identification information are connected. Accordingly, transmission controlling section 203 obtains the release pattern bit sequence from the release information and performs a logical AND operation of the pattern bit sequence and the release pattern bit sequence, thereby generating the "desired pattern bit sequence."

As described above, according to this embodiment, the control information generated in setting section 101 of base station 100 is the identification information of the two resource patterns among the resource patterns for identifying the reference signal resource candidate group (here, corresponding to the first SRS resource candidate group).

Specifically, the identification information of the two resource patterns is selected from the "partial table of the SRS resource pattern table." Accordingly, it is possible to reduce the number of bits necessary for indication.

Further, a difference between the SRS resource pattern table and the partial table of the SRS resource pattern table corresponds to resource pattern candidates which are less frequently used.

Embodiment 4

In Embodiment 4, a difference between the first desired SRS resource candidate group in the macro cell and the desired SRS resource candidate group in the pico cell in Embodiment 1 is defined as the desired SRS resource candidate group in the macro cell (hereinafter, referred to as a "second desired SRS resource candidate group in the macro cell"). The "second desired SRS resource candidate group in the macro cell" is comprised of SRS resource candidates actually used for SRS transmission in the macro cell. Accordingly, hereinafter, the "second desired SRS resource candidate group in the macro cell" is also referred to as the "SRS resource actual candidate group in the macro cell." In Embodiment 4, the first desired SRS resource candidate group in the macro cell is identified based on the "SRS resource actual candidate group in the macro cell" and the desired SRS resource candidate group in the pico cell. Because a base station and a terminal according to Embodiment 4 are the same as base station 100 and terminal 200 in Embodiment 1, the description will be provided using FIG. 8 and FIG. 9.

In base station 100 of Embodiment 4, setting section 101 determines the first desired SRS resource candidate group in the macro cell taking into account the amount of SRS resources necessary for each of plurality of terminals 200 located in the macro cell served by base station 100 and pico cell interference. Setting section 101 sets the SRS resource actual candidate group in the macro cell based on the determined first desired SRS resource candidate group in the macro cell and the desired SRS resource candidate group in the pico cell. Setting section 101 selects the identification information of the SRS resource pattern corresponding to the SRS resource actual candidate group in the macro cell from the "SRS resource pattern table." Further, setting section 101 selects the identification information of the SRS resource pattern corresponding to the desired SRS resource candidate group in the pico cell from the "SRS resource pattern table."

Setting section 101 sets the selected two items of identification information corresponding to the two SRS resource pattern candidates as "SRS actual resource information." Specifically, setting section 101 sets a connected bit sequence where bit sequences respectively representing the two items of identification information are connected as the "SRS actual resource information." For example, in the connected bit sequence, the bit sequence indicating the identification information of the SRS resource pattern corresponding to the SRS resource actual candidate group is placed followed by the bit sequence indicating the identification information of the SRS resource pattern corresponding to the SRS resource actual candidate group in the pico cell. The SRS actual resource information generated in this way is indicated to part of terminals (i.e., terminal 200 which is an LTE-A terminal) located in the macro cell through coding and modulating section 102, transmission processing section 104 and transmitting section 105.

Here, unlike Embodiment 1, in Embodiment 4, information relating to the desired SRS resource candidate group in the macro cell (i.e., the first per-cell indication in Embodiment 1) is not transmitted from base station 100 to terminal 200 or is not used at terminal 200 even if the information is transmitted from base station 100 to terminal 200.

Reception processing section 107 identifies a resource to which the P-SRS is mapped based on the information relating to the SRS resource actual candidate group received from setting section 101 and extracts a signal component mapped to the identified resource from the reception signal.

In terminal 200 of Embodiment 4, reception processing section 202 extracts the second per-cell indication, the assignment control information and the data signal included in the reception signal. That is, reception processing section 202 extracts the SRS actual resource information, the assignment control information and the data signal included in the reception signal.

Reception processing section 202 outputs the SRS actual resource information and the assignment control information to transmission controlling section 203.

Transmission controlling section 203 identifies the first desired SRS resource candidate group in the macro cell based on the SRS actual resource information received from reception processing section 202 and the SRS resource pattern table.

Specifically, first, transmission controlling section 203 divides the connected bit sequence transmitted from base station 100 as the SRS actual resource information into a "first partial bit sequence" and a "second partial bit sequence." The "first partial bit sequence" described here indicates the identification information of the SRS resource pattern corresponding to the SRS resource actual candidate group. Further, the "second partial bit sequence" described here indicates the identification information of the SRS resource pattern corresponding to the SRS resource actual candidate group in the pico cell. Transmission controlling section 203 identifies an SRS resource pattern candidate which matches the "first partial bit sequence" and identifies the first SRS resource pattern based on an SRS resource pattern parameter associated with the SRS resource pattern candidate. Further, transmission controlling section 203 identifies an SRS resource pattern candidate which matches the "second partial bit sequence" and identifies the second SRS resource pattern based on an SRS resource pattern parameter associated with the SRS resource pattern candidate. By the first SRS resource pattern and the second SRS resource pattern identified in this way, the first desired SRS resource candidate group in the macro cell is designated. That is, the first desired SRS resource candidate group in the macro cell is comprised of the SRS resource candidates belonging to at least one of the first SRS resource pattern and the second SRS resource pattern.

For example, when SRS transmission with an interval of 10 ms is planned in the macro cell, and SRS transmission with an interval of 2 ms is planned in the pico cell, the SRS resource pattern candidate where the identification information of the SRS resource pattern (i.e., srs-SubframeConfig) is 2 (transmission interval TSFC=interval of 2 ms, offset amount ΔSFC=1) is selected in the pico cell. Meanwhile, the SRS resource pattern candidate (transmission interval TSFC=interval of 10 ms, offset amount ΔSFC=0) where the identification information of the SRS resource pattern (i.e., srs-SubframeConfig) is 9 is selected as the SRS resource pattern candidate corresponding to the SRS resource actual candidate group in the macro cell. Accordingly, the first desired SRS resource candidate group in the macro cell is comprised of the first, second, fourth, sixth, eighth, and tenth sub frames.

As described above, according to this embodiment, in base station 100, setting section 101 sets the actual resource candidate group (here, corresponding to the SRS resource actual candidate group in the macro cell) configured with the resource candidates actually used for transmission of the reference signal among the plurality of resource candidates included in the first desired resource candidate group based on the first desired resource candidate group (here, corresponding to the desired SRS resource candidate group in the macro cell) and the second desired resource candidate group (here, corresponding to the desired SRS resource candidate group in the pico cell) in the second area which is subjected to interference from the first area by the reference signal. Setting section 101 outputs the identification information of the first resource pattern for identifying the actual resource candidate group and the identification information of the second resource pattern for identifying the second desired resource candidate group. The identification information of the first resource pattern and the identification information of the second resource pattern are transmitted to terminal 200.

Further, according to this embodiment, in terminal 200, reception processing section 202 extracts the identification information of the first resource pattern for identifying the actual resource candidate group (here, corresponding to the SRS resource actual candidate group in the macro cell) configured with the resource candidates actually used for transmission of the reference signal among the plurality of resource candidates included in the first desired resource candidate group (here, corresponding to the desired SRS resource candidate group in the macro cell) and the identification information of the second resource pattern for identifying the second desired resource candidate group, from the signal transmitted from base station 100. Transmission controlling section 203 identifies the first desired resource candidate group (here, corresponding to the desired SRS resource candidate group in the macro cell) based on the identification information of the first resource pattern and the identification information of the second resource pattern.

Other Embodiments

[1] In the above-described embodiments, the first per-cell indication is defined as control information indicated to all the terminals and the second per-cell indication is defined as control information indicated to part of the terminals. However, the present invention is not limited to this, and it is also possible to define the first per-cell indication as an indication which can be read by an LTE terminal and an LTE-A terminal, and define the second per-cell indication as an indication which can be read by only an LTE-A terminal. Alternatively, it is also possible to define the first per-cell indication as an indication defined using the LTE and define the second per-cell indication as an indication defined using the LTE-A.

[2] In Embodiment 2 and Embodiment 3, the description has been provided assuming that the SRS resource pattern table used for selecting the two SRS resource pattern candidates is identical. However, the present invention is not limited to this, and the first SRS resource pattern table may be different from the second SRS resource pattern table. The first SRS resource pattern table is a table used for selecting an SRS resource pattern candidate which matches the desired SRS resource candidate group in the pico cell. The second SRS resource pattern table is a table used for selecting an SRS resource pattern candidate corresponding to a difference between the desired SRS resource candidate group in the macro cell and the SRS resource pattern candidate which matches the desired SRS resource candidate group in the pico cell. For example, when the macro cell requires an SRS resource pattern which is more complicated than that required in the pico cell, the first SRS resource pattern table is configured to include a larger number of SRS resource candidates than the number of SRS resource candidates in the second SRS resource pattern table.

[3] In the LTE, a Shortened PUCCH Format is defined where when the SRS and the PUCCH (Physical Uplink Control CHannel) are not present in the same symbol, the PUCCH is transmitted using seven symbols, while when the SRS and the PUCCH are present in the same symbol, the PUCCH is orthogonally encoded and transmitted using six symbols.

In the above-described embodiments, while the first per-cell indication can be read by all the terminals, the second per-cell indication can be read by only part of the terminals. In this case, when only the part of the terminals employs the Shortened PUCCH Format, there is a case where the PUCCH of each terminal cannot be made orthogonal.

Therefore, the setting of the Shortened PUCCH Format is not applied on the basis of the first desired SRS resource candidate group in the macro cell, but applied on the basis of only the first SRS resource candidate group. Specifically, regardless of whether or not the group is the first desired SRS resource candidate group in the macro cell, the Shorten PUCCH Format is used in the subframes of the first SRS resource candidate group. By this means, it is possible to introduce the first desired SRS resource candidate group in the macro cell without breaking orthogonality of the PUCCH.

[4] In the above-described embodiments, the description has been provided assuming a heterogeneous network (HetNet). However, the present invention is not limited to this, and it is also possible to apply the present invention to between cells with larger interference. For example, it is possible to apply the present invention to a P-SRS such as in Coordinated Multiple Points (CoMP) transmission and reception among base stations.

[5] In Embodiment 2 and Embodiment 3, the description has been provided assuming that a table defined in the LTE is reused as the SRS resource pattern table. However, the present invention is not limited to this, and it is also possible to use a table different from the table defined in the LTE as the SRS resource pattern table.

[6] Because when the same SRS resource is used in the macro cell and the pico cell, interference occurs between the cells, the same SRS resource is less likely to be used in the macro cell and the pico cell.

Accordingly, in Embodiment 3, when srs-SubframeConfig=1 is selected for the macro cell, srs-SubframeConfig=1 can be deleted from a table of the pico cell. By this means, it is possible to flexibly assign the first desired SRS resource candidate group in the macro cell and reduce the amount of indication.

[7] In each of the above-described embodiments, the description has been provided using the P-SRS. However, the present invention is not limited to this, and it is also possible to apply the present invention to a pilot signal such as a Dynamic Aperiodic SRS or other transmission signals.

[8] The second per-cell indication in each of the above-described embodiments may not be constantly indicated, and may be indicated only in an environment such as, for example a heterogeneous network (HetNet).

[9] In each of the above-described embodiments, the description has been provided assuming that the SRS resource pattern candidates which can be set for the first per-cell indication and the second per-cell indication are different from each other. However, the present invention is not limited to this, and the same SRS resource pattern candidate may be set for the first per-cell indication and the second per-cell indication. That is, the second per-cell indication is configured with four bits as in the first per-cell indication. A case where this method is applied to Embodiment 1 will be described as an example. When an interval of 2 ms (offset amount ΔSFC=0) is set for the first per-cell indication and an interval of 5 ms (offset amount ΔSFC=0) is set for the second per-cell indication, the first SRS resource candidate group includes the first, third, fifth, seventh and ninth subframes. Further, by removing the first and sixth subframes from the first SRS resource candidate group, the second SRS resources candidate group include the third, fifth, seventh and ninth subframes. In this way, the SRS resources which cannot be set only with the first per-cell indication can be set using the second per-cell indication, which increases combinations (patterns) which can be set as the SRS resources compared to a case where only the first per-cell indication is used. That is, it is possible to flexibly set the SRS resources.

[10] While Embodiments 1 to 3 have been described assuming that the AND or the exclusive OR is used, the present invention is not limited to this, and it is also possible to use other calculating methods which can realize similar operation.

[11] In Embodiments 1 to 3, the present invention is described using a case where the present invention is implemented as hardware. However, the present invention can be achieved by software in concert with hardware.

The functional blocks described in Embodiments 1 to 3 are achieved by an LSI, which is typically an integrated circuit. The functional blocks may be provided as individual chips, or part or all of the functional blocks may be provided as a single chip. Depending on the level of integration, the LSI may be referred to as an IC, a system LSI, a super LSI, or an ultra LSI.

In addition, the circuit integration is not limited to LSI and may be achieved by dedicated circuitry or a general-purpose processor other than an LSI. After fabrication of LSI, a field programmable gate array (FPGA), which is programmable, or a reconfigurable processor which allows reconfiguration of connections and settings of circuit cells in LSI may be used.

Should a circuit integration technology replacing LSI appear as a result of advancements in semiconductor technology or other technologies derived from the technology, the functional blocks could be integrated using such a technology. Another possibility is the application of biotechnology and/or the like.

The disclosure of Japanese Patent Application No. 2011-147557, filed on Jul. 1, 2011, including the specification, drawings and abstract, are incorporated herein by reference in its entirety.

INDUSTRIAL APPLICABILITY

The receiving apparatus, the transmitting apparatus, the setting method and the identifying method of the present invention are useful for improving flexibility of setting of a resource candidate to be utilized in transmission of a reference signal.

REFERENCE SIGNS LIST

100 Base station
101 Setting section
102, 103 Coding and Modulating section
104 Transmission processing section
105, 207 Transmitting section
106, 201 Receiving section
107, 202 Reception processing section
108 Data receiving section
109 SRS receiving section
200 Terminal
203 Transmission controlling section
204 Reference signal generating section
205 Data signal generating section
206 Transmission signal forming section

The invention claimed is:

1. A receiving apparatus configured to receive a reference signal transmitted from a transmitting apparatus located in a first area, the reference signal being transmitted using a resource candidate belonging to a first desired resource candidate group, the receiving apparatus comprising:
    a setting section that sets a reference signal resource candidate group including the first desired resource candidate group and a second desired resource candidate group in a second area which is subjected to interference from the first area by the reference signal, that generates release information for releasing an excessive resource which is included in the reference signal resource candidate group but is not included in the first desired resource candidate group from the reference signal resource candidate group, and that outputs the generated release information and identification information of a resource pattern for identifying the reference signal resource candidate group; and
    a transmitting section that transmits the identification information of the resource pattern and the release information to the transmitting apparatus.

2. The receiving apparatus according to claim 1, wherein the release information indicates a position of the excessive resource in one frame.

3. The receiving apparatus according to claim 1, wherein the release information is a release pattern bit sequence, the release pattern bit sequence includes a plurality of bits respectively corresponding to a plurality of subframes included in one frame, and each of the bits indicates whether or not to release the corresponding subframe from a state of being a transmission candidate subframe of the reference signal.

4. The receiving apparatus according to claim 1, wherein the release information is identification information of two resource patterns of a resource pattern group for identifying the reference signal resource candidate group.

5. The receiving apparatus according to claim 4, wherein first identification information in the identification information of the two resource patterns is identification information of a resource pattern for identifying the second desired resource candidate group, and second identification information is identification information of a resource pattern for identifying a difference between the first desired resource candidate group and the second desired resource candidate group.

6. The receiving apparatus according to claim 5, wherein a first resource pattern group for identifying the first desired resource candidate group and a second resource pattern group for identifying a difference between the first desired resource candidate group and the second desired resource candidate group have at least a part different from each other.

7. The receiving apparatus according to claim 6, wherein the at least part is a resource pattern which is less frequently used.

8. A transmitting apparatus configured to transmit a reference signal to a receiving apparatus configured to provide a cell that covers a first area, using a resource candidate belonging to a first desired resource candidate group, the transmitting apparatus comprising:
    a reception processing section that extracts from a signal transmitted from the receiving apparatus, identification information of a resource pattern for identifying a reference signal resource candidate group including the first desired resource candidate group and a second desired resource candidate group in a second area which is subjected to interference from the first area by the reference signal, and release information for releasing an excessive resource which is included in the reference signal resource candidate group but is not included in the first desired resource candidate group from the reference signal resource candidate group; and a control section that identifies the first desired resource candidate group based on the identification information of the resource pattern and the release information.

9. The transmitting apparatus according to claim 8, wherein the release information indicates a position of the excessive resource in one frame.

10. The transmitting apparatus according to claim 8, wherein the release information is a release pattern bit sequence, the release pattern bit sequence includes a plurality of bits respectively corresponding to a plurality of subframes included in one frame, and each of the bits indicates whether or not to release the corresponding subframe from a state of being a transmission candidate subframe of the reference signal.

11. The transmitting apparatus according to claim 10, wherein:
the control section generates, based on the identification information of the resource pattern, a pattern bit sequence including a number of bits that is identical to a number of subframes included in one frame, each of the bits indicating whether or not to release the corresponding subframe from a state of being the transmission candidate subframe of the reference signal; and
the control section generates a desired pattern bit sequence corresponding to the first desired resource candidate group by performing a logical AND operation of the pattern bit sequence and the release pattern bit sequence.

12. The transmitting apparatus according to claim 8, wherein first identification information in the identification information of two resource patterns is identification information of a resource pattern for identifying the second desired resource candidate group, and second identification information is identification information of a resource pattern for identifying a difference between the first desired resource candidate group and the second desired resource candidate group.

13. The transmitting apparatus according to claim 8, wherein a first resource pattern group for identifying the first desired resource candidate group and a second resource pattern group for identifying a difference between the first desired resource candidate group and the second desired resource candidate group have at least a part different from each other.

14. The transmitting apparatus according to claim 13, wherein the at least part is a resource pattern which is less frequently used.

15. A setting method for a resource candidate belonging to a first desired resource candidate group used for transmission of a reference signal by a transmitting apparatus located in a first area, the setting method comprising:
setting a reference signal resource candidate group including the first desired resource candidate group and a second desired resource candidate group in a second area which is subjected to interference from the first area by the reference signal;
generating release information for releasing an excessive resource which is included in the reference signal resource candidate group but is not included in the first desired resource candidate group from the reference signal resource candidate group; and transmitting identification information of a resource pattern and the release information to the transmitting apparatus.

16. A transmitting method for transmitting a reference signal to a receiving apparatus configured to provide a cell that covers a first area, using a resource candidate belonging to a first desired resource candidate group, the transmitting method comprising:
extracting from a signal transmitted from the receiving apparatus, identification information of a resource pattern for identifying a reference signal resource candidate group including the first desired resource candidate group and a second desired resource candidate group in a second area which is subjected to interference from the first area by the reference signal, and release information for releasing an excessive resource which is included in the reference signal resource candidate group but is not included in the first desired resource candidate group from the reference signal resource candidate group; and
identifying the first desired resource candidate group based on the identification information of the resource pattern and the release information.

17. A receiving apparatus configured to receive a reference signal transmitted from a transmitting apparatus located in a first area, using a resource candidate belonging to a first desired resource candidate group, the receiving apparatus comprising:
a setting section that sets an actual use resource candidate group which includes resource candidates used for transmission of the reference signal from a plurality of resource candidates included in the first desired resource candidate group based on the first desired resource candidate group and a second desired resource candidate group in a second area which is subjected to interference from the first area by the reference signal, and that outputs identification information of a first resource pattern for identifying the actual use resource candidate group and identification information of a second resource pattern for identifying the second desired resource candidate group; and
a transmitting section that transmits the identification information of the first resource pattern and the identification information of the second resource pattern to the transmitting apparatus.

18. A transmitting apparatus configured to transmit a reference signal to a receiving apparatus configured to provide a cell that covers a first area, using a resource candidate belonging to a first desired resource candidate group, the transmitting apparatus comprising:
a reception processing section that extracts from a signal transmitted from the receiving apparatus, identification information of a first resource pattern for identifying an actual use resource candidate group including resource candidates used for transmission of the reference signal among a plurality of resource candidates included in the first desired resource candidate group and identification information of a second resource pattern for identifying the second desired resource candidate group; and
a controlling section that identifies the first desired resource candidate group based on the identification information of the first resource pattern and the identification information of the second resource pattern.

* * * * *